United States Patent
Yamashita et al.

(10) Patent No.: US 9,121,159 B2
(45) Date of Patent: Sep. 1, 2015

(54) CONSTRUCTION MACHINE AND METHOD FOR REPORTING QUALITY OF DRIVING OPERATIONS OF CONSTRUCTION MACHINE

(71) Applicants: Koichi Yamashita, Hiratsuka (JP); Masaaki Okamoto, Hiratsuka (JP)

(72) Inventors: Koichi Yamashita, Hiratsuka (JP); Masaaki Okamoto, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/385,834

(22) PCT Filed: Nov. 27, 2012

(86) PCT No.: PCT/JP2012/080630
§ 371 (c)(1),
(2) Date: Sep. 17, 2014

(87) PCT Pub. No.: WO2013/145439
PCT Pub. Date: Oct. 3, 2013

(65) Prior Publication Data
US 2015/0081165 A1   Mar. 19, 2015

(30) Foreign Application Priority Data
Mar. 26, 2012  (JP) .................................. 2012-070302

(51) Int. Cl.
*G06F 11/30* (2006.01)
*E02F 9/26* (2006.01)
(Continued)

(52) U.S. Cl.
CPC .................. *E02F 9/26* (2013.01); *E02F 9/2066* (2013.01); *E02F 9/2095* (2013.01);
(Continued)

(58) Field of Classification Search
CPC ............ F02D 41/029; F02D 2041/228; F02D 41/1448; F02D 2041/026; F02D 2200/604
USPC ..................................... 701/50, 102, 108, 109
See application file for complete search history.

(56) References Cited

U.S. PATENT DOCUMENTS 7,207,171 B2 *   4/2007  Nagaoka et al. ................. 60/295
8,744,702 B2 *   6/2014  Hyodo et al. .................... 701/52
(Continued)

FOREIGN PATENT DOCUMENTS

JP   2002285890 A   10/2002
JP   2003302276 A   10/2003
(Continued)

OTHER PUBLICATIONS

Notice of Reason(s) for Rejection issued Nov. 12, 2013 in corresponding Japanese Patent Application No. 2012-070302, including English translation, 5 pages.
(Continued)

Primary Examiner — Redhwan K Mawari
(74) Attorney, Agent, or Firm — Fish & Richardson P.C.

(57) ABSTRACT

A construction machine provided with an exhaust gas purifying device for an internal combustion engine includes an energy-wasting operation judging unit that judges whether or not an operation of the construction machine is an energy-wasting operation, a judgment result notifier that notifies a judgment result of the energy-wasting operation judging unit to an outside, a regeneration treatment judging unit that judges whether or not a regeneration treatment of the exhaust gas purifying device is to be conducted, and a notification restricting unit that restricts the judgment result notifier from notifying the judgment result of the energy-wasting operation judging unit when the regeneration treatment judging unit judges that the regeneration treatment of the exhaust gas purifying device is to be conducted.

4 Claims, 8 Drawing Sheets

(51) Int. Cl.
*F01N 3/023* (2006.01)
*F01N 9/00* (2006.01)
*E02F 9/20* (2006.01)
*E02F 9/22* (2006.01)
*F02D 29/04* (2006.01)
*F02D 29/00* (2006.01)
*F02D 29/02* (2006.01)

(52) U.S. Cl.
CPC ............ *E02F 9/2235* (2013.01); *E02F 9/2285* (2013.01); *E02F 9/2296* (2013.01); *E02F 9/267* (2013.01); *F01N 3/023* (2013.01); *F01N 9/002* (2013.01); *F02D 29/00* (2013.01); *F02D 29/02* (2013.01); *F02D 29/04* (2013.01); *F01N 2430/00* (2013.01); *F01N 2590/08* (2013.01); *Y02T 10/47* (2013.01)

(56) References Cited

U.S. PATENT DOCUMENTS

| | | | |
|---|---|---|---|
| 2005/0150142 A1* | 7/2005 | Matsuda et al. | 37/414 |
| 2006/0287841 A1* | 12/2006 | Hoshi et al. | 702/182 |
| 2007/0156319 A1 | 7/2007 | Matsuda et al. | |
| 2010/0211293 A1* | 8/2010 | Yamada et al. | 701/108 |
| 2013/0202493 A1* | 8/2013 | Noma et al. | 422/119 |
| 2013/0312616 A1* | 11/2013 | Shibamori et al. | 96/419 |
| 2014/0290237 A1* | 10/2014 | Yoshida et al. | 60/452 |
| 2014/0318883 A1* | 10/2014 | Noguchi et al. | 180/309 |
| 2014/0352282 A1* | 12/2014 | Mitsuda | 60/282 |

FOREIGN PATENT DOCUMENTS

| | | |
|---|---|---|
| JP | 2005098073 A | 4/2005 |
| JP | 2005098988 A | 4/2005 |
| JP | 2009257323 A | 11/2009 |
| JP | 2011127456 A | 6/2011 |
| JP | 2012012975 A | 1/2012 |
| WO | WO2007072701 A1 | 6/2007 |

OTHER PUBLICATIONS

International Search Report mailed Jan. 22, 2013 in International Application No. PCT/JP2012/080630, including English translation, 4 pages.
Office Action issued Jan. 20, 2015 for corresponding Japanese Patent Application No. 2014-037499, 3 pages.

* cited by examiner

CONSTRUCTION MACHINE AND METHOD FOR REPORTING QUALITY OF DRIVING OPERATIONS OF CONSTRUCTION MACHINE

CROSS-REFERENCE TO RELATED APPLICATIONS

This application claims priority to International Application No. PCT/JP2012/080630 filed on Nov. 27, 2012, which application claims priority to Japanese Application No. 2012-070302, filed on Mar. 26, 2012. The contents of the above applications are incorporated herein by reference in their entireties.

TECHNICAL FIELD

The present invention relates to a construction machine provided with an exhaust gas purifying device for an internal combustion engine and a method for notifying whether an operation of the construction machine is appropriate or not.

BACKGROUND ART

On an operation of a construction machine, there has been typically known a technology of notifying an operator whether or not an energy-saving operation is in progress and requesting the operator to conduct an energy-saving operation.

For instance, Patent Literature 1 discloses a technology of turning a lamp on or off based on whether or not an open degree of an accelerator and an actual engine speed satisfy energy-saving operation conditions and of requesting the operator to conduct an energy-saving operation.

On the other hand, in vehicles (e.g. construction machines) including a diesel engine as a drive source, there has been known a construction machine provided with an exhaust gas purifying device for an internal combustion engine including a Diesel Particulate Filter (DPF) for removing particulate matters (PM) contained in the exhaust gas of the diesel engine.

In such a construction machine provided with the exhaust gas purifying device for an internal combustion engine, a regeneration treatment to burn the PM deposited in the DPF is widely performed. Specifically, there has been known a construction machine in which a guidance for requesting the regeneration treatment is displayed on a monitor device when the PM deposited in the DPF reaches a predetermined amount (see, for instance, Patent Literature 2).

Then, when the guidance for requesting the regeneration treatment is displayed on the monitor device and the operator conducts the regeneration treatment to the DPF of the exhaust gas purifying device in accordance with the guidance, the operator stops operations of working equipment and the like and holds the construction machine in an idling state.

CITATION LIST

Patent Literature(s)

Patent Literature 1: International Publication No. WO2007/072701
Patent Literature 2: JP-A-2009-257323

SUMMARY OF THE INVENTION

Problem to be Solved by the Invention

However, when the technology disclosed in Patent Literature 1 is applied to a construction machine provided with an exhaust gas purifying device for an internal combustion engine, though the operator has to keep the idling state without operating a control lever of the working equipment or an accelerator of the engine during the regeneration treatment of the DPF, the operator may be annoyingly notified by a lighted lamp or a voice that an energy-saving operation is requested.

An object of the invention is to provide a construction machine in which unnecessary information for urging an energy-saving operation is not notified when the regeneration treatment of the exhaust gas purifying device for the internal combustion engine is conducted, and a method for notifying whether an operation of the construction machine is appropriate or not.

Means for Solving the Problems

According to a first aspect of the invention, a construction machine provided with an exhaust gas purifying device for an internal combustion engine includes: an energy-wasting operation judging unit that judges whether or not an operation of the construction machine is an energy-wasting operation; a judgment result notifier that notifies a judgment result of the energy-wasting operation judging unit to an outside; a regeneration treatment judging unit that judges whether or not a regeneration treatment of the exhaust gas purifying device is to be conducted; and a notification restricting unit that restricts the judgment result notifier from notifying the judgment result of the energy-wasting operation judging unit, when the regeneration treatment judging unit judges that the regeneration treatment of the exhaust gas purifying device is to be conducted.

According to a second aspect of the invention, the construction machine in the first aspect of the invention further includes: an operation unit that operates working equipment of the construction machine; and an operation detector that detects an operation of the operating unit, in which the energy-wasting operation judging unit judges that the operation of the construction machine is the energy-wasting operation when the operation detector detects that the operation unit is not operated for a predetermined time or locked.

According to the third aspect of the invention, in the construction machine in the first or second aspect of the invention, a plurality of work modes each having a different workload are allowed to be set in the construction machine, and the energy-wasting operation judging unit judges that the operation of the construction machine is the energy-wasting operation when the construction machine is operable in one of the work modes with a small load although the construction machine is set in another one of the work modes with a large load.

According to a fourth aspect of the invention, a method for notifying whether an operation of a construction machine provided with an exhaust gas purifying device for the internal combustion engine is appropriate or not includes: notifying to an outside whether or not the operation of the construction machine is an energy-wasting operation, in which, when a regeneration treatment of the exhaust gas purifying device is judged to be conducted, a notification on whether or not the operation of the construction machine is the energy-wasting operation is restricted.

According to the first aspect of the invention, when it is judged that the regeneration treatment of the exhaust gas purifying device is to be conducted, the notification restricting unit restricts the notification of the judgment result obtained by the energy-wasting operation judging unit. Accordingly, in the regeneration treatment of the exhaust gas purifying device, unnecessary information on saving energy is not notified, so that the operator is not disturbed.

According to the second aspect of the invention, the energy-wasting operation judging unit judges that the operation of the construction machine is a fuel-inefficient operation when the operation detector detects that the operation unit of the working equipment is not operated for a predetermined time or locked.

Although the regeneration treatment of the exhaust gas purifying device needs to be conducted in an idling state, since the notification restricting unit restricts the notification by the judgment result notifier, unnecessary information on saving energy is not notified, so that the operator is not disturbed.

According to the third aspect of the invention, the energy-wasting operation judging unit judges the operation of the construction machine as a fuel-inefficient operation when the construction machine is operable in a work mode with a small load although the construction machine is set in a work mode with a large load.

Although the regeneration treatment of the exhaust gas purifying device needs to be conducted in an idling state and may be conducted even in a work mode with a small load, the operation after the regeneration treatment is occasionally restarted in a work mode with a large load. Even in such a case, unnecessary information on saving energy is not notified, so that the operator is not disturbed.

According to the fourth aspect of the invention, the same effects and advantages as those in the first aspect of the invention can be obtained.

DESCRIPTION OF EMBODIMENT(S)

An exemplary embodiment of the invention will be described below with reference to the attached drawings.

First Exemplary Embodiment

[1] Overall Structure

Figure 1:
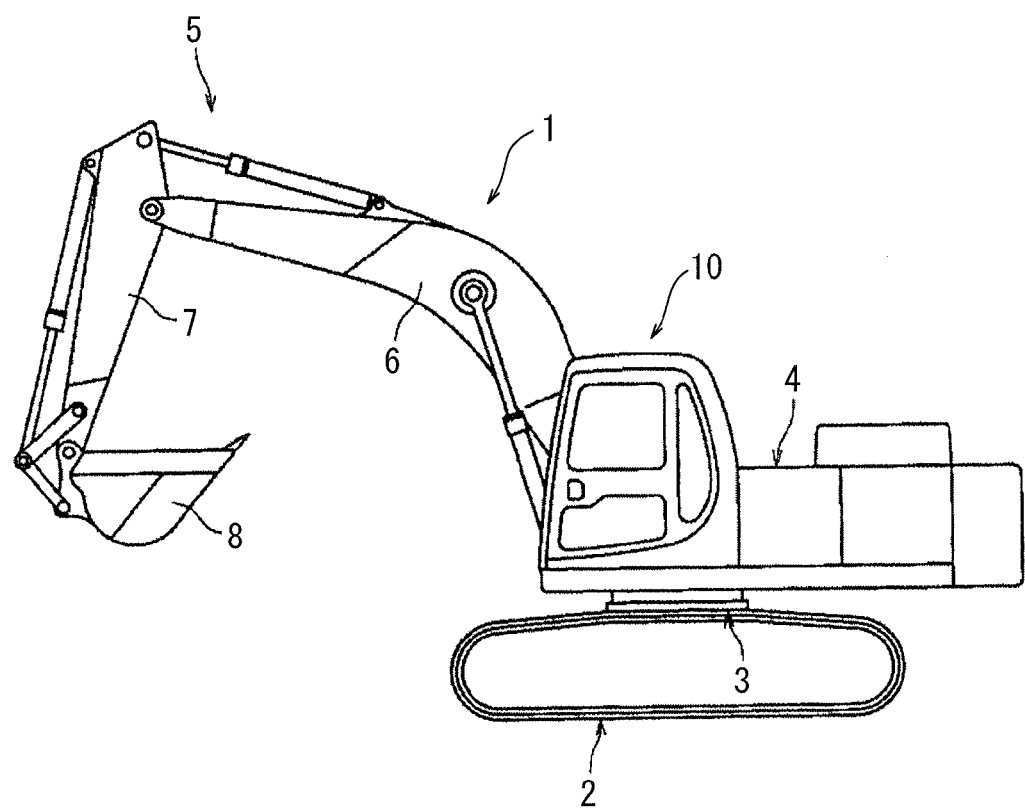
FIG. 1 is a side elevation showing a construction machine according to a first exemplary embodiment of the invention.

FIG. 1 shows a hydraulic excavator 1 (construction machine) according to a first exemplary embodiment of the invention.

The hydraulic excavator 1 includes: an undercarriage 2; an upper swing body 4 mounted on an upper side of the undercarriage 2 via a rotating mechanism 3 in a rotatable manner; and working equipment 5 continuously provided to the upper swing body 4.

The working equipment 5 includes: a boom 6 of which base is swingably connected to the upper swing body 4; an arm 7 swingably connected to an end of the boom 6; and a bucket 8 swingably connected to an end of the arm 7.

The upper swing body 4 includes a cab 10 for an operator driving the hydraulic excavator 1 to get in.

Figure 2:
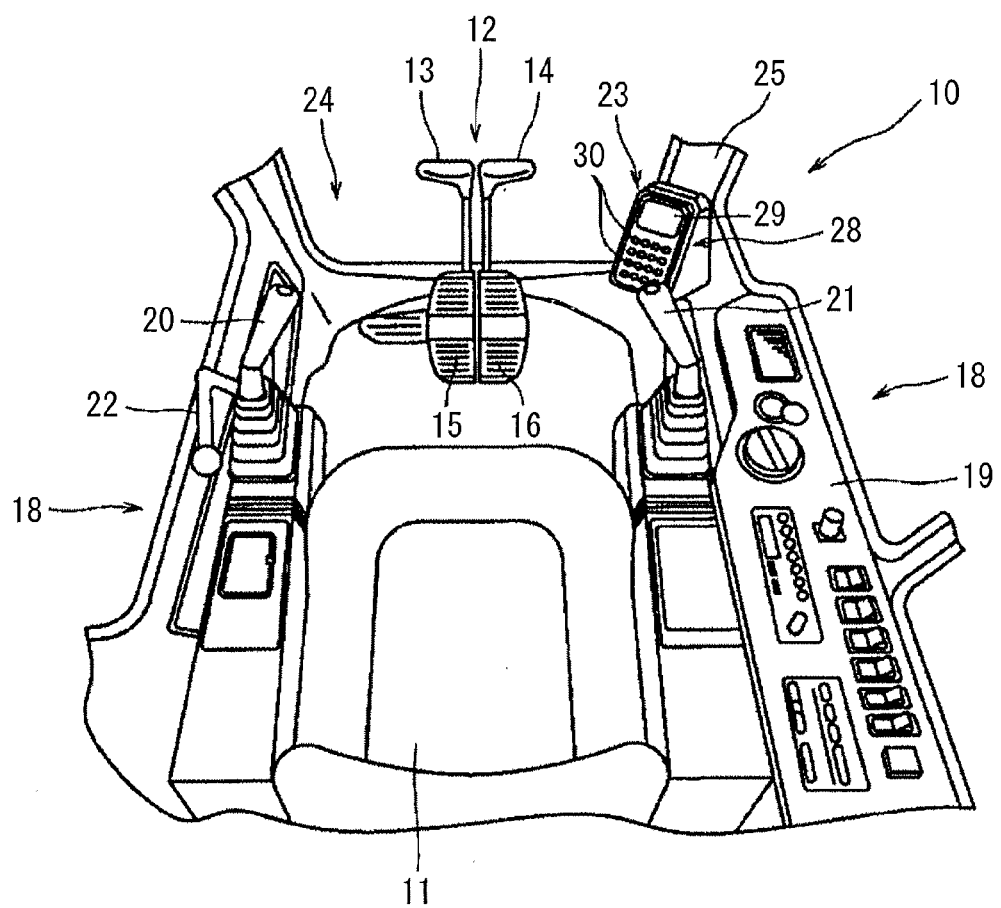
FIG. 2 is a perspective view showing a part of a cab of the construction machine of the first exemplary embodiment.

As shown in FIG. 2, an operator's seat 11 is situated at the center of the cab 10 of the upper swing body 4 and a travel operation unit 12 is provided at the front of the operator's seat 11. The travel operation unit 12 includes drive levers 13 and 14 and drive pedals 15 and 16 that are moved forward and backward integrally with the drive levers 13 and 14.

The undercarriage 2 of the hydraulic excavator 1 of this exemplary embodiment advances when pushing the drive levers 13 and 14 forward and moves backward when pulling the drive levers 13 and 14 rearward. An instrument panel 19 is provided at a right side of the operator's seat 11 (i.e. near a side window 18).

Control levers 20 and 21 are provided on respective sides of the operator's seat 11. The control lever 20 effects a swing movement of the arm 7 and a rotation of the upper swing body 4. The control lever 21 effects a vertical (i.e. up and down) movement of the boom 6 and a turning movement of the bucket 8. A lock lever 22 is provided near the control lever 20.

The lock lever 22 stops an operation of the working equipment 5, the rotation of the upper swing body 4, a travel movement of the undercarriage 2 and the like. In other words, by pulling the lock lever 22 upward, the movement of the working equipment 5 and the like can be locked, where the working equipment 5 and the like do not work even by operating the control levers 20, 21 and the like.

A monitor device 23 for displaying various conditions (e.g. engine water temperature, hydraulic fluid temperature and fuel level) of the hydraulic excavator 1 is provided in the cab 10.

The monitor device 23 is provided at a lower side of one of vertical frames 25 that separate a front window 24 from the side windows 18 in the cab 10. A monitor screen 29 and an operation switch 30 (an operation input unit) are provided on a front side of an exterior case 28 of the monitor device 23. The monitor screen 29 is provided, for instance, by a liquid crystal panel. Although the operation switch 30 is integrated with the monitor device 23 in this exemplary embodiment, the operation switch may be independent of the monitor device (e.g., to the instrumental panel 19 in the cab).

An efficiency display lamp 30A for requesting the operator to conduct an energy-saving operation is provided below the monitor screen 29 of the monitor device 23. The efficiency display lamp 30A, which is provided with a built-in red LED, is turned off when a later-described operation of the hydraulic excavator 1 is not a fuel-inefficient energy-wasting operation but is a fuel-efficient operation, and notifies the operator that the hydraulic excavator 1 is in operation in an energy-saving condition.

On the other hand, when the operation of the hydraulic excavator 1 is in the fuel-inefficient energy-wasting operation, the efficiency display lamp 30A is turned on and notifies the operator that the hydraulic excavator 1 is in a fuel-inefficient condition.

In the exemplary embodiment, the efficiency display lamp 30A is turned off when the operation of the hydraulic excavator 1 is not a fuel-inefficient energy-wasting operation but is a fuel-efficient operation while the efficiency display lamp 30A is turned on in the fuel-inefficient energy-wasting operation. However, the arrangement of the notification of the operation condition is not exhaustive.

For instance, a green LED may be built in the efficiency display lamp. The efficiency display lamp may be turned off when the hydraulic excavator 1 is in the fuel-inefficient energy-wasting operation and turned on when the hydraulic excavator 1 is in the fuel-efficient operation, thereby notifying the operator that the hydraulic excavator 1 is in the fuel-inefficient energy-wasting operation.

Alternatively, a green LED and a red LED may be built in the efficiency display lamp. The green LED of the efficiency display lamp may be turned on when the hydraulic excavator 1 is not in the fuel-inefficient energy-wasting operation but in the fuel-efficient operation and the red LED of the efficiency display lamp may be turned on when the hydraulic excavator 1 is in the fuel-inefficient energy-wasting operation, thereby notifying the operator whether or not the hydraulic excavator 1 is in the energy-wasting operation.

It should be noted that the indication of the efficiency display lamp is not only made by being turned ON and OFF or by a combination of different display colors, but also may be made by being flashed and turned OFF or by being turned ON and flashed. Further, alternatively, in place of the efficiency display lamp, an image may be displayed on the monitor screen of the monitor device.

[2] Structure of Control System of Hydraulic Excavator 1

Figure 3:
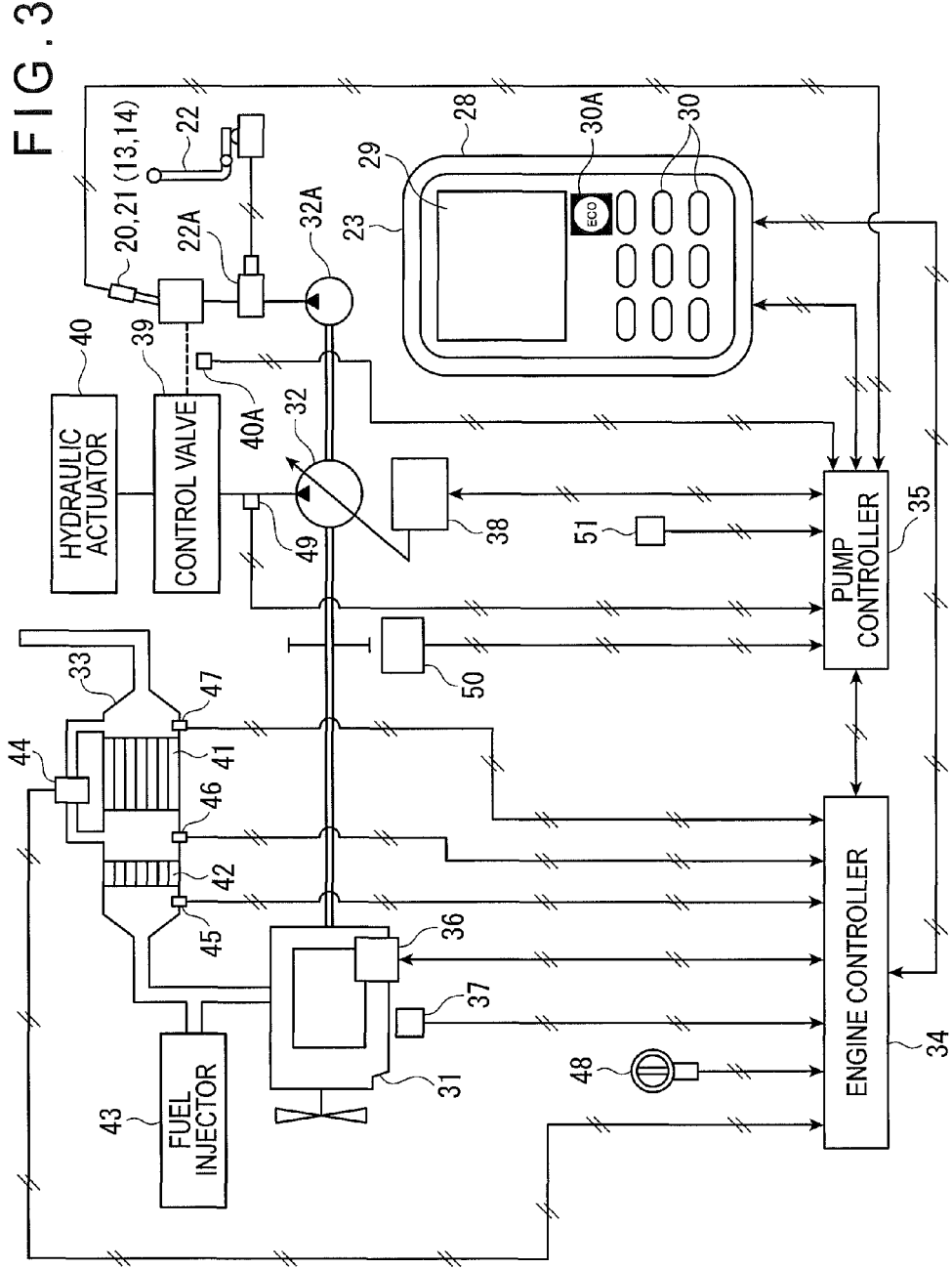
FIG. 3 is a diagram showing a control system of the construction machine of the first exemplary embodiment.

FIG. 3 shows a control system of the hydraulic excavator 1.

The control system of the hydraulic excavator 1 controls an engine 31, a hydraulic pump 32 and an exhaust gas purifying device 33. The control system includes an engine controller 34 and a pump controller 35. The monitor device 23, the engine controller 34 and the pump controller 35 are mutually connected in a manner capable of communication via CAN (Controller Area Network).

The engine 31 (the internal combustion engine of the invention) is a diesel engine driven by a fuel of light oil. The engine 31 includes: a fuel pump 36 that includes a common rail fuel injection device and pumps fuel to a common rail; and an engine water temperature sensor 37 that detects a water temperature of cooling water of the engine 31. An output shaft of the engine 31 is connected to the hydraulic pump 32.

The hydraulic pump 32 is an axial piston pump that includes a swash plate driven by a swash-plate drive device 38 and adjusts a discharge pressure of the hydraulic fluid according to a rotary position of the swash plate. A hydraulic actuator 40 is connected to a hydraulic-fluid discharge side of the hydraulic pump 32 via a control valve 39. The hydraulic actuator 40 includes a boom cylinder, an arm cylinder, a bucket cylinder, a rotary hydraulic motor, a travel hydraulic motor and the like (all not illustrated).

A hydraulic pump 32A for generating a pilot pressure is connected to the hydraulic pump 32. A discharge side of the hydraulic pump 32A is connected to the control levers 20 and 21 and the drive levers 13 and 14 via a pilot line. When the control lever 20 or 21 or the drive lever 13 or 14 is operated, the discharge pressure of the control valve 39 is changed via the pilot line to drive the hydraulic actuator 40 of the work equipment 5. The engine 31 and the hydraulic pump 32 are provided in the upper swing body 4.

A solenoid valve 22A is provided between the hydraulic pump 32A and the control levers 20 and 21 (the drive levers 13 and 14). When the lock lever 22 is operated to a lock-side, the pilot line is blocked by the solenoid valve 22A, so that the hydraulic actuator 40 is not actuated even when the operator operates the control levers 20 and 21 and the drive levers 13 and 14.

A pressure sensor 40A detects whether the control levers 20 and 21 and the drive levers 13 and 14 are operated or not.

The pressure sensor 40A may be provided by an analog sensor or an on-off sensor. The pressure sensor 40A is provided, for instance, in the pilot line for transmitting the operation on the control levers 20 and 21 and the drive levers 13 and 14 to the control valve 39. A potentiometer may be installed in the control lever in place of the pressure sensor 40A in order to judge whether the control lever is operated or not.

The exhaust gas purifying device 33 is a device that removes the PM (Particulate Matter) contained in the exhaust gas of the engine 31. The exhaust purifying device 33 includes a filter 41 and an oxidation catalyst 42.

The filter 41 is made of a ceramic and the like and captures the PM contained in the exhaust gas.

The oxidation catalyst 42 reduces nitrogen monoxide (NO) among nitrogen oxides (NOx) in the exhaust gas and increases nitrogen dioxide ($NO_2$). The oxidation catalyst 42 also oxidizes hydrocarbon fed by a fuel injector 43 provided at an upstream of a flow of the exhaust gas relative to the oxidation catalyst 42 to effect the regeneration treatment of the filter 41 in which the PM captured by the filter 41 is combusted by a reaction heat generated by the oxidation of the hydrocarbon fed by the fuel injector 43. The hydrocarbon fed by the fuel injector 43 may be, for instance, light oil (i.e. fuel).

Though the fuel injector 43 is provided to an exhaust path between the engine 31 and the oxidation catalyst 42 in this exemplary embodiment, the fuel may be fed to a combustion chamber of the engine 31 during an exhaust stroke of the engine 31 and unburned fuel may be fed to the exhaust gas purifying device 33 (i.e. post injection).

The exhaust gas purifying device 33 in the exemplary embodiment is provided with the oxidation catalyst 42 on the upstream side of the filter 41. However, the arrangement of the exhaust gas purifying device 33 is not exhaustive. Specifically, the exhaust gas purifying device may be provided with the oxidation catalyst directly supported in the filter. Alternatively, the exhaust gas purifying device may be provided with the oxidation catalyst directly supported in the filter and another oxidation catalyst disposed on the upstream side of the filter.

The exhaust gas purifying device 33 includes: a differential pressure sensor 44 that detects a differential pressure between inlet and outlet sides of the filter 41; and temperature sensors 45, 46 and 47 that respectively detect the temperatures of an inlet side of the exhaust gas purifying device 33, an inlet side of the filter 41 and an outlet side of the exhaust gas purifying device 33. The detected values detected by the sensors 44 to 47 are output to the engine controller 34 in a form of electric signals.

The differential pressure sensor 44 is provided by a single sensor in this exemplary embodiment. However, the differential pressure sensor 44 may alternatively be provided by pressure sensors respectively provided to the inlet and outlet sides of the filter 41, where the pressure values detected by the pressure sensors are output to the engine controller 34 in a form of electric signals to obtain the difference between the pressure values.

The engine controller 34 controls a engine speed of the engine 31 in accordance with a engine speed set by a fuel dial 48. The control results of the engine 31, the water temperature detected by the engine water temperature sensor 37 and the like are output to the monitor device 23 in a form of electric signals.

Although the detailed description is made later, the engine controller 34 judges whether to conduct the regeneration treatment of the exhaust gas purifying device 33 based on the electric signals from the differential pressure sensor 44 of the exhaust gas purifying device 33.

In this exemplary embodiment, it is judged by pressure whether the regeneration treatment of the filter 41 is necessary or not. However, a rotation sensor, load sensor and/or temperature sensor may alternatively be used to judge whether the regeneration treatment is necessary or not, specifically by calculating a PM discharge amount and PM combustion amount to obtain a PM deposit amount from a difference between the PM discharge amount and the PM combustion amount, and accumulating the PM deposit amount in a time-series manner, thereby judging whether the filter 41 is clogged or not.

The pump controller 35 controls the swash-plate drive device 38 based on detected values of a pressure sensor 49 that detects a discharge pressure of the hydraulic pump 32 and an engine speed sensor 50 provided to the output shaft connecting the engine 31 with the hydraulic pump 32. The pump controller 35 generates data indicating whether the control levers 20 and 21 and the drive levers 13 and 14 are operated or not based on the pressure sensor 40A provided to the pilot line and outputs the data to the monitor device 23 in a form of electric signals.

[3] Structure to Judge Appropriateness of Operation and Notify the Judgment

Figure 4:
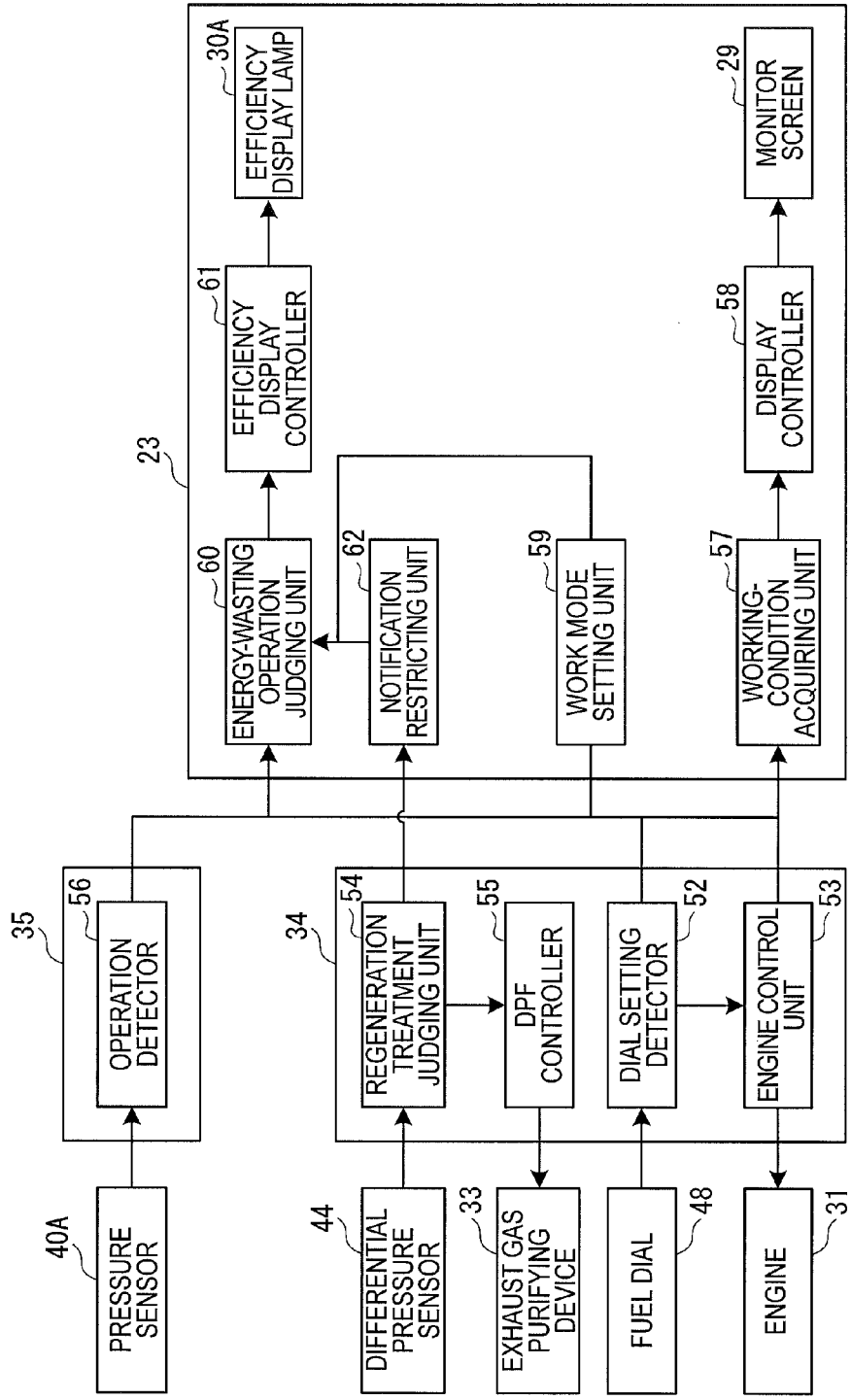
FIG. 4 is a functional block diagram showing judgment and notification on whether or not an energy-wasting operation is in progress in the first exemplary embodiment.

FIG. 4 is a functional block diagram showing the engine controller 34, the pump controller 35, and the monitor device 23 which are electrically connected via CAN.

The engine controller 34 includes a dial setting detector 52, an engine control unit 53, a regeneration treatment judging unit 54, and a DPF controller 55.

The dial setting detector 52 detects the engine speed set by the fuel dial 48 and outputs the engine speed in a form of electric signals to the engine control unit 53.

The engine control unit 53 controls the engine speed of the engine 31 based on the set engine speed and outputs information (e.g., an engine water temperature) as a working condition of the engine 31 to the monitor device 23.

The regeneration treatment judging unit 54 detects the electric signals from the differential pressure sensor 44 of the exhaust gas purifying device 33 and simultaneously judges that the regeneration treatment of the exhaust gas purifying device 33 is to be conducted when the value of the differential pressure sensor 44 exceeds a predetermined threshold (automatic regeneration).

Moreover, the regeneration treatment judging unit 54 monitors a regeneration treatment start switch (not shown) provided in the cab 10. When the operator manipulates the regeneration treatment start switch, the regeneration treatment judging unit 54 also judges that the regeneration treatment is to be conducted (manual regeneration).

After judging that regeneration treatment is necessary, the regeneration treatment judging unit 54 outputs the judgment to the DPF controller 55. The DPF controller 55 outputs a control signal to the fuel injector 43, whereby the fuel is injected into the exhaust gas purifying device 33 to start the regeneration treatment of the exhaust gas purifying device 33. Further, the regeneration treatment judging unit 54 outputs the judgment result in a form of electric signals on whether to conduct the regeneration treatment to the monitor device 23.

Based on the information transferred from the regeneration treatment judging unit 54, a display of requesting the regeneration treatment of the exhaust gas purifying device 33 is shown on the monitor screen 29 of the monitor device 23. However, the display of requesting the regeneration treatment may be made not only on the monitor screen 29 but also by a lamp provided on the instrument panel and the like.

According to the display of requesting the regeneration treatment, the operator of the hydraulic excavator 1 stops the hydraulic excavator on a flat ground. Then, the operator sets the engine 31 at a predetermined engine speed (e.g. at a low idling state) by not touching the levers 13, 14, 20 and 21 of the working equipment and the like or by operating the lock lever 22 to a lock side.

Next, the operator manipulates the operation switch 30 provided on the monitor device 23 to start the regeneration treatment of the exhaust gas purifying device 33. It should be noted that the signals to start the regeneration treatment may be triggered not only by the operation switch 30 on the monitor screen 23 but also by other operation switches provided on the instrument panel and the like.

After the regeneration treatment of the exhaust gas purifying device 33 is started, a display indicating that the regeneration treatment is in progress is made on the monitor screen 29. However, the display indicating that the regeneration treatment is in progress may be seen not only on the monitor screen 29 but also by a lamp provided on the instrument panel and the like.

When the regeneration treatment of the exhaust gas purifying device 33 is terminated, the display indicating that the regeneration treatment is in progress is turned off to notify the operator that the regeneration treatment is ended.

The pump controller 35 includes an operation detector 56 and detects operation conditions of the control levers 20 and 21 and the drive levers 13 and 14 by the detection signal from the pressure sensor 40A. The detection results of the operation of the levers in a form of electric signals are output to the monitor device 23.

The monitor device 23 includes a working-condition acquiring unit 57, a display controller 58, a work mode setting unit 59, an energy-wasting operation judging unit 60, an efficiency display controller 61, and a notification restricting unit 62.

The working-condition acquiring unit 57 acquires the condition of the operation switch 30 and various detection values output from the engine controller 34 and the pump controller 35 through CAN, and outputs the condition of the hydraulic excavator 1 to the display controller 58.

On the monitor screen 29, the display controller 58 displays as images the cooling water temperature and a fuel residual volume acquired by the working-condition acquiring unit 57, a later-described work mode set by the operator, and the like.

The work mode setting unit 59 sets in accordance with manipulation on the operation switch 30 provided on the monitor device 23 whether to emphasize the fuel efficiency or the work operation in the operation of the hydraulic excavator 1. The work mode set by the work mode setting unit 59 is output to the pump controller 35. The pump controller 35 controls absorption torque of the hydraulic pump 32.

The work mode set by the work mode setting unit 59 is also output to the energy-wasting operation judging unit 60.

It should be noted that construction machines (e.g., hydraulic excavator) are generally provided with a plurality of work modes respectively representing types of basic work operations with different workloads. Examples of the work modes include "P mode" and "E mode." Each of the work modes is roughly described as follows.

The "P mode" (emphasizing the workload) refers to a work mode for performing a large-load excavation work, where the output torque of the engine 31 and the absorption torque of the hydraulic pump 32 are matched in an area with relatively high engine speed and output torque.

The "E mode" (emphasizing the fuel efficiency) refers to a work mode for performing an excavation work with smaller load than that in the P mode and a light work such as scraping operation, where engine output torque characteristics are set lower than those in the P mode.

The energy-wasting operation judging unit 60 judges whether or not the operation of the hydraulic excavator 1 is an energy-wasting operation based on the operation conditions of the control levers 20 and 21 and the drive levers 13 and 14 output from the operation detector 56 of the pump controller 35 or the conditions set by the work mode setting unit 59. The judgment result by the energy-wasting operation judging unit 60 is output to the efficiency display controller 61.

Specifically, the energy-wasting operation judging unit 60 judges whether or not the operation of the hydraulic excavator 1 is an energy-wasting operation based on the following standard.

(1) Operation-Representing Item Name: Idling for Long Time

"Idling for a long time" refers to a condition in which all of the hydraulic actuators of the work equipment 5 and the like have not been operated (all of the levers 13, 14, 20 and 21 are not operated or the lock lever 22 is locked) consecutively for a predetermined time while the engine 31 is in operation. The levers to be used for the judgment may be appropriately determined in accordance with types of vehicles (e.g. a wheel loader). However, the levers for operating the working equipment are preferably used for the judgment.

(2) Operation-Representing Item Name: E-Mode Recommendation

"E-mode recommendation" refers to a condition in which the work mode set by the work mode setting unit 59 is not the E mode but is set at a mode (e.g. the P mode) that consumes more fuel than in the E mode, and actually generated power falls within a range of the power generatable in the E mode.

The generated power is obtainable by multiplying the values of the engine speed and the engine output torque that are output from the engine controller 34.

Thus, when the conditions of "idling for a long time" and/or "E-mode recommendation" are satisfied, the operation of the hydraulic excavator 1 is judged as an energy-wasting operation to deteriorate the fuel efficiency.

The efficiency display controller 61 controls displaying the efficiency display lamp 30A based on the judgment result by the energy-wasting operation judging unit 60 and functions as a judgment result notifier of the invention In the exemplary embodiment, when the energy-wasting operation judging unit 60 judges that the operation of the hydraulic excavator 1 is an energy-wasting operation, the efficiency display controller 61 turns on the efficiency display lamp 30A. When the energy-wasting operation judging unit 60 judges that the operation of the hydraulic excavator 1 is a fuel-efficient operation, the efficiency display controller 61 turns off the efficiency display lamp 30A.

Based on the judgment result of whether to conduct the regeneration treatment, which is output from the regeneration treatment judging unit 54 of the engine controller 34, the notification restricting unit 62 restricts the efficiency display controller 61 from controlling display of the efficiency display lamp 30A based on the judgment result by the energy-wasting operation judging unit 60.

[4] Operation and Advantages of First Exemplary Embodiment

Operations of the engine controller 34, the pump controller 35, and the monitor device 23 described above will be described with reference to the flowchart shown in FIG. 5. In the first exemplary embodiment, a case where idling is kept for a long time without operating the control levers 20, 21, 13, 14 for a predetermined time will be described.

The energy-wasting operation judging unit 60 acquires various working information of the hydraulic excavator 1 from the operation detector 56 of the pump controller 35 and the dial setting detector 52 and the engine control unit 53 of the engine controller 34 (Step S1).

Next, the energy-wasting operation judging unit 60 monitors the operating conditions of the levers 20, 21, 13 and 14 to judge whether the levers have not been operated consecutively for a predetermined time (Step S2).

When it is judged that one of the levers has been operated within the predetermined time, the process returns to Step S1.

On the other hand, when it is judged that the levers have not been operated consecutively for the predetermined time or when the lock lever 22 is in a lock state, the notification restricting unit 62 checks the judgment by the regeneration treatment judging unit 54 of the engine controller 34 on whether to conduct the regeneration treatment of the exhaust gas purifying device 33 (Step S3).

Herein, the judgment that the regeneration treatment is necessary also includes a case where the regeneration treatment of the exhaust gas purifying device 33 is in progress.

When the regeneration treatment judging unit 54 judges that the regeneration treatment is not necessary, without the restriction by the notification restricting unit 62, the efficiency display controller 61 turns on the efficiency display lamp 30A based on the judgment result by the energy-wasting operation judging unit 60 (Step S4).

When the regeneration treatment judging unit 54 judges that the regeneration treatment is necessary, irrespective of the judgment result by the energy-wasting operation judging unit 60, the notification restricting unit 62 restricts the efficiency display controller 61 from controlling turning on/off the efficiency display lamp 30A so as to keep the efficiency display lamp 30A off without turning on the efficiency display lamp 30A (Step S5).

According to the first exemplary embodiment, when the regeneration treatment judging unit 54 judges that the regeneration treatment of the exhaust gas purifying device 33 is necessary, the efficiency display controller 61 is restricted from controlling turning on/off the efficiency display lamp 30A based on the judgment result of the energy-wasting operation judging unit 60, whereby unnecessary information on energy-saving is avoided from being notified, so that the operator is not disturbed.

When it is judged that the regeneration treatment is not necessary, the efficiency display lamp 30A is turned on, thereby informing the operator of the hydraulic excavator 1 being in the fuel-inefficient operation and requesting the operator to improve the operation.

Second Exemplary Embodiment

Next, a second exemplary embodiment of the invention will be described. The same components as described above will be denoted by the same reference numerals and the description thereof will be omitted in the following description.

Figure 5:
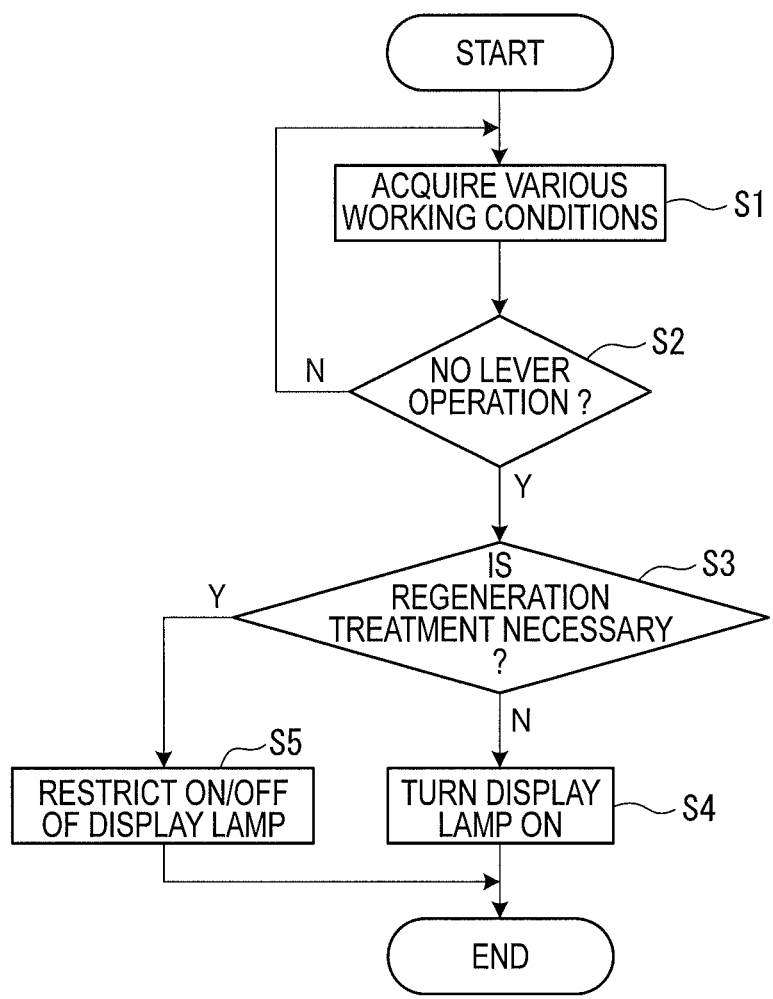
FIG. 5 is a flowchart showing an operation according to the first exemplary embodiment.

In the first exemplary embodiment, in the flowchart shown in FIG. 5, after the energy-wasting operation judging unit 60 checks the conditions of the control levers 20 and 21 and the lock lever 22 of the working equipment 5, the regeneration treatment judging unit 54 judges whether the regeneration treatment of the exhaust gas purifying device 33 is necessary.

In contrast, in the second exemplary embodiment, although the structure of the hydraulic excavator 1 and the functional block shown in FIGS. 1 to 4 are exactly the same, the operation is different from that in the first exemplary embodiment.

Figure 6:
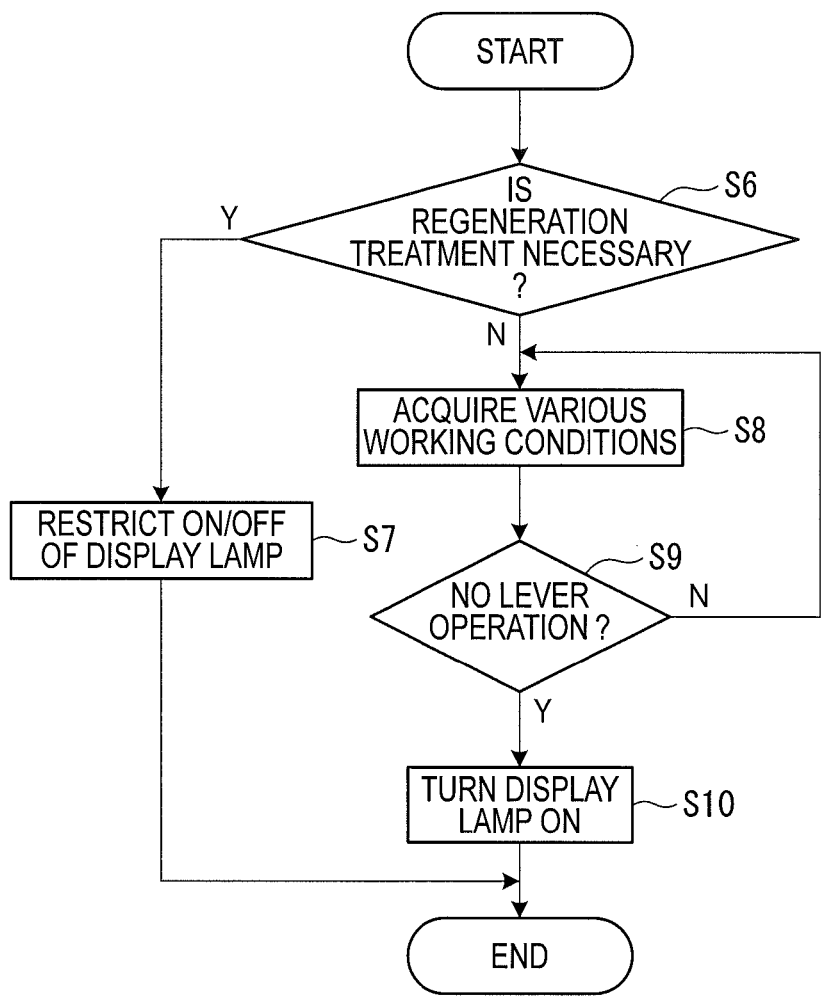
FIG. 6 is a flowchart showing an operation according to a second exemplary embodiment of the invention.

Specifically, as shown in the flowchart in FIG. 6, the regeneration treatment judging unit 54 firstly judges whether or not the regeneration treatment of the exhaust gas purifying device 33 is necessary (Step S6).

When the regeneration treatment judging unit 54 judges that the regeneration treatment is necessary, the judgment is output to the notification restricting unit 62. The notification restricting unit 62 restricts the efficiency display controller 61 from controlling turning on/off the efficiency display lamp 30A so as to keep the efficiency display lamp 30A off (Step S7).

In the same manner as in the first exemplary embodiment, the judgment that the regeneration treatment is necessary also includes the case where the regeneration treatment of the exhaust gas purifying device 33 is in progress.

When the regeneration treatment judging unit 54 judges that the regeneration treatment is not necessary, the energy-wasting operation judging unit 60 acquires various working information of the hydraulic excavator 1 from the operation detector 56 of the pump controller 35 and the dial setting detector 52 and the engine control unit 53 of the engine controller 34 (Step S8).

The energy-wasting operation judging unit 60 monitors the operating conditions of the levers 20, 21, 13 and 14 to judge whether the levers have not been operated consecutively for a predetermined time (Step S9).

When it is judged that one of the levers has been operated within the predetermined time, the process returns to Step S8.

On the other hand, when it is judged that the levers have not been operated consecutively for the predetermined time or when the lock lever 22 is in a lock state, the energy-wasting operation judging unit 60 outputs the judgment to the efficiency display controller 61. The efficiency display controller 61 then turns on the efficiency display lamp 30A (Step S10).

The same advantages as those in the first exemplary embodiment can also be obtained in the second exemplary embodiment.

Third Exemplary Embodiment

Next, a third exemplary embodiment of the invention will be described.

In the first exemplary embodiment, the judgment result notifier is provided by turning on/off the efficiency display lamp 30A.

Figure 7:
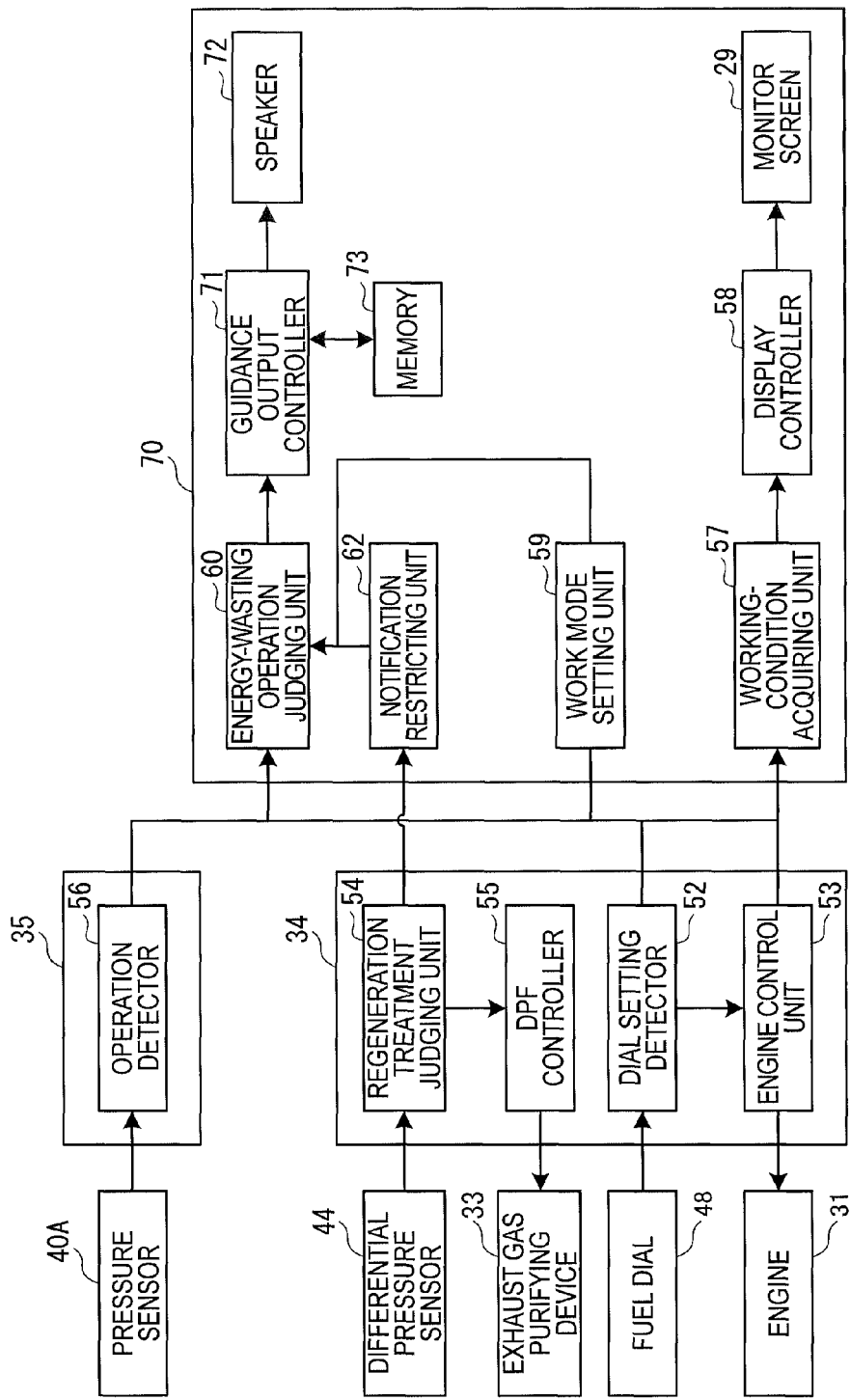
FIG. 7 is a functional block diagram showing judgment and notification on whether or not an energy-wasting operation is in progress in a third exemplary embodiment of the invention.

In contrast, a monitor device 70 according to the third exemplary embodiment includes a guidance output controller 71, a speaker 72, and a memory 73 as shown in FIG. 7. When the energy-wasting operation judging unit 60 judges that the operation is fuel-inefficient, guidance, for instance, in a form of a voice is output from the speaker 72 to notify the operator of the judgment.

The guidance output controller 71 retrieves from the memory 73 a message differing according to the judgment results of the energy-wasting operation judging unit 60. Then, the guidance output controller 71 outputs the message in a form of an audio guidance through the speaker 72.

For instance, when the energy-wasting operation judging unit 60 judges that the control levers have not been operated consecutively for a predetermined time and the engine is in idling for a long time, the guidance output controller 71 retrieves audio information of "Keep off idling for a long time" stored in the memory 73 and outputs the audio information in a form of an audio guidance through the speaker 72.

When the energy-wasting operation judging unit 60 judges that the working equipment 5 is actually operable in the E mode even though the work mode is set in the P mode by the work mode setting unit 59, the guidance output controller 71 retrieves audio information of "Application of E mode is recommended" stored in the memory 73 and outputs the audio information in a form of an audio guidance through the speaker 72.

Figure 8:
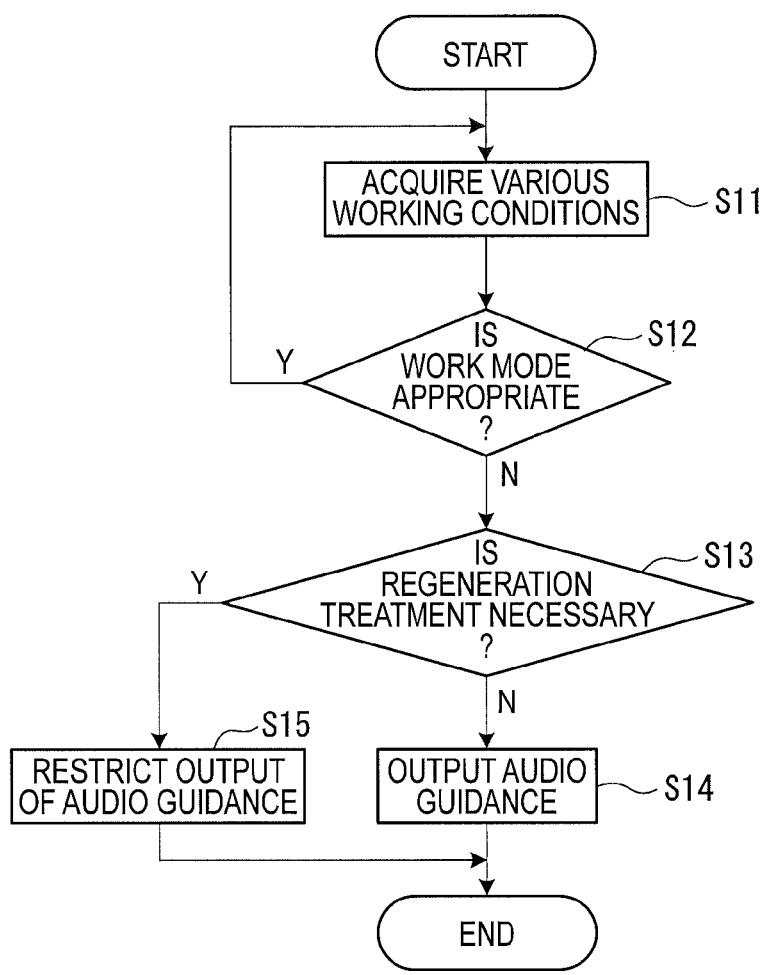
FIG. 8 is a flowchart showing an operation of the third exemplary embodiment.

Next, the operation in the third exemplary embodiment will be described with reference to the flowchart shown in FIG. 8. In the third exemplary embodiment, a case where the working equipment 5 is operable in the E mode although being set in the P mode by the work mode setting unit 59 will be described.

The energy-wasting operation judging unit 60 acquires various working information of the hydraulic excavator 1 from the operation detector 56 of the pump controller 35 and the dial setting detector 52 and the engine control unit 53 of the engine controller 34 (Step S11).

Next, the energy-wasting operation judging unit 60 judges whether the actual work operation of the hydraulic excavator in the work mode set by the work mode setting unit 59 can be conducted in the work mode (herein, the E mode) that requires fuel consumption smaller than that of the set work mode (herein, the P mode), in other words, whether the set work mode is appropriate or not (Step S12).

When the work mode is judged to be appropriate, the process returns to Step S11.

When the work mode is judged to be inappropriate, the regeneration treatment judging unit 54 judges whether the regeneration treatment of the exhaust gas purifying device 33 is necessary or not and outputs the judgment result to the notification restricting unit 62 (Step S6).

When the regeneration treatment judging unit 54 judges that the regeneration treatment is not necessary, without the restriction by the notification restricting unit 62, the guidance output controller 71 outputs an audio guidance of "Application of the E mode is recommended" through the speaker 72 based on the judgment result by the energy-wasting operation judging unit 60 (Step S14).

When the regeneration treatment judging unit 54 judges that the regeneration treatment is necessary, the notification restricting unit 62 restricts the guidance output controller 71 from outputting the audio guidance irrespective of the judgment result by the energy-wasting operation judging unit 60 (Step S15).

According to the above third exemplary embodiment, the same advantages as those in the first exemplary embodiment are obtainable. Since the output of the audio guidance may be annoying to the operator, the arrangement according to the above exemplary embodiment prevents the operator from being disturbed by the output of the unnecessary audio information during the regeneration treatment.

However, in place of outputting the audio guidance, for instance, a guidance by letters, which is provided by saving the contents of the audio guidance in a form of text information in a memory, may be output to be displayed on the monitor screen 29 of the monitor device 23, together with other display contents such as the engine water temperature and the fuel residual volume.

Modification(s) of Exemplary Embodiment(s)

In the first and second exemplary embodiments, the judgment by the energy-wasting operation judging unit 60 is made based on the standard on the idling for a long time, but may be made based on the standard on the E mode recommendation that is one of recommended work modes.

In the E mode recommendation, it is judged based on a relationship between a target engine speed set by the fuel dial 48 and the engine torque during the operation whether or not an intersection of the target engine speed and the engine torque is positioned to form an operation movement within a predetermined fuel-efficient range.

Even in this case, when a light work such as scraping is conducted in the work mode set in the P mode, change of the P mode to the E mode that is more fuel-efficient than the P mode allows the intersection to fall within the fuel-efficient range, thereby providing the same advantages as those in the above exemplary embodiments.

In the above exemplary embodiments, although the necessity of the regeneration treatment of the exhaust gas purifying device 33 is judged by the engine controller 34 and the display of efficiency display lamp 30A is restricted by the efficiency display controller 61 of the monitor device 23, such arrangements are not exhaustive. In other words, the judgment and the treatments including the above treatments may be implemented by any controllers. Further, the controllers may be integrated.

The invention claimed is:

1. A construction machine provided with an exhaust gas purifying device for an internal combustion engine, the construction machine comprising:
   an energy-wasting operation judging unit that judges whether or not an operation of the construction machine is an energy-wasting operation;
   a judgment result notifier that notifies a judgment result of the energy-wasting operation judging unit to an outside;
   a regeneration treatment judging unit that judges whether or not a regeneration treatment of the exhaust gas purifying device is to be conducted; and
   a notification restricting unit that restricts the judgment result notifier from notifying the judgment result of the energy-wasting operation judging unit, when the regeneration treatment judging unit judges that the regeneration treatment of the exhaust gas purifying device is to be conducted wherein,
   a plurality of work modes each having a different workload are allowed to be set in the construction machine, and
   the energy-wasting operation judging unit judges that the operation of the construction machine is the energy-wasting operation when the construction machine is operable in one of the work modes with a small load although the construction machine is set in another one of the work modes with a large load.

2. The construction machine according to claim 1, further comprising:
   an operation unit that operates working equipment of the construction machine; and
   an operation detector that detects an operation of the operating unit, wherein
   the energy-wasting operation judging unit judges that the operation of the construction machine is the energy-wasting operation when the operation detector detects that the operation unit is not operated for a predetermined time or locked.

3. A method for notifying whether an operation of a construction machine that is provided with an exhaust gas purifying device for an internal combustion engine and in which a plurality of work modes each having a different work load are allowed to be set is appropriate or not, the method comprising:
   judging that the operation of the construction machine is an energy-wasting operation when the construction machine is operable in one of the work modes with a small load although the construction machine is set in another one of the work modes with a large load; and
   notifying to an outside whether or not the operation of the construction machine is the energy-wasting operation, wherein
   when a regeneration treatment of the exhaust gas purifying device is judged to be conducted, a notification on whether or not the operation of the construction machine is the energy-wasting operation is restricted.

4. The construction machine according to claim 1, wherein
   the energy-wasting operation judging unit judges whether or not the operation of the construction machine is the energy-wasting operation, using power generated from the engine.

\* \* \* \* \*